June 10, 1924.

T. A. WRY

METHOD OF ENAMELING PIPE JOINTS

Filed Oct. 10, 1921

1,497,396

Inventor,
Thomas A. Wry,
by Albert G. Davis
His Attorney.

Patented June 10, 1924.

1,497,396

UNITED STATES PATENT OFFICE.

THOMAS A. WRY, OF LYNN, MASSACHUSETTS.

METHOD OF ENAMELING PIPE JOINTS.

Application filed October 10, 1921. Serial No. 506,838.

*To all whom it may concern:*

Be it known that I, THOMAS A. WRY, a citizen of the United States, residing at Lynn, in the county of Essex, State of Massachusetts, have invented certain new and useful Improvements in Methods of Enameling Pipe Joints, of which the following is a specification.

In the construction of metal pipe lines having a continuous inner surface of enamel such as vitreous enamel or the like, one of the most difficult things is to obtain joints which are thoroughly enameled so the continuity of the enameled surface is unbroken. This is a thing which is very essential if the pipe line is to be absolutely protected throughout its inner surface. The object of my present invention is to provide an improved method of enameling the joints of a pipe line which is simple to carry out and insures a continuous enameled surface, and for a consideration of what I believe to be novel and my invention attention is directed to the accompanying description and the claims appended thereto.

Figure 1:
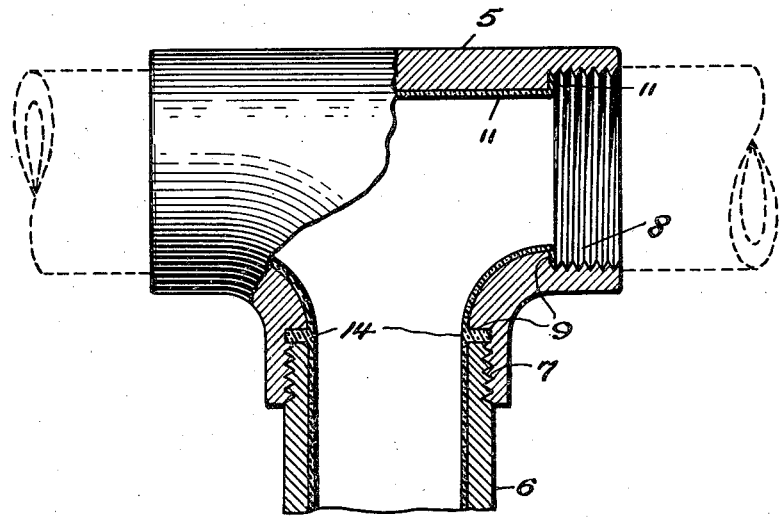
Figure 2:
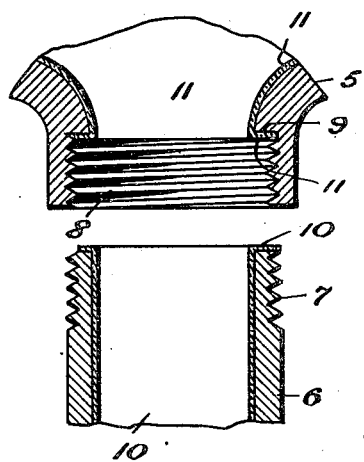
Figure 3:
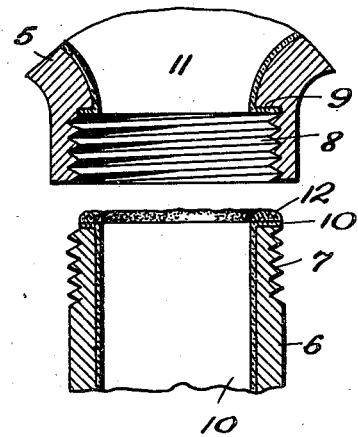
Figure 4:
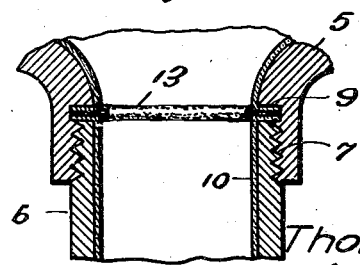

In the drawing, Fig. 1 is a side elevation partly in section showing a pipe joint made in accordance with my invention; and Figs. 2, 3 and 4 are views illustrating steps in carrying out my invention.

Referring to the drawing 5 indicates a pipe fitting such as an elbow, a T, a Y, or the like and 6 a pipe to be connected thereto, the end of the pipe being threaded on the outside in the usual manner as indicated at 7.

Now, according to my invention I provide a coupling having threaded openings as indicated at 8 and at the inner end of the threaded portion I provide a shoulder 9 of a height approximately equal to the thickness of the wall of the pipe 6 so that when the pipe is threaded into the coupling its inner surface comes flush with the surface of the coupling. Or, viewed from another aspect, I take a coupling and counterbore the openings to a depth equal to that desired for the threads and then cut threads on the counterbored portion. I enamel the inside of the pipe 6 over its entire surface and on the end as shown at 10, and enamel the inside of fitting 5 including shoulder or shoulders 9 but leave the threads bare without enamel, as indicated at 11. This is shown particularly in Fig. 2. This enameling may be carried out by any suitable method. I next place liquid enamel around shoulder 9 and on the end of pipe 6 or at both places and screw the end of the pipe and the fitting together until the end of the pipe is spaced slightly from the shoulder. The liquid enamel I preferably employ is that ordinarily termed vitreous enamel, and it may comprise suitable enamel materials ground together and mixed with water. I may employ any of the vitreous enamels such as are commonly used for coating metals with enamel. Formulas for such enamels may be found in the Grunwald and Hodgson book entitled "Enameling on Iron and Steel," published in 1909 by Charles Griffen and Company, Limited, Exeter St., Strand, London, England. To obtain a correct spacing between them I preferably screw them together until the end of the pipe and the shoulder are in engagement and then unscrew them again until the pipe end and shoulder are spaced apart the desired distance. For example, I have found a space of approximately $\frac{1}{32}$ inch between the end of the pipe and the shoulder satisfactory. In Fig. 3 I have shown pipe end 6 as having liquid enamel 12 on its end and in Fig. 4 I have shown them screwed together to the desired point. In Fig. 4 it will be noted that liquid enamel fills the space between the shoulder and the pipe end and is heaped up more or less outside as indicated at 13. I then let the liquid enamel dry after which the joint is heated by a torch or other suitable means to bring the temperature up to the fusing point of the enamel. The enamel is thus fused and runs together so as to produce a smooth evenly covered joint as shown at 14 in Fig. 1.

It will be understood, of course, that instead of applying the liquid enamel prior to screwing the coupling and pipe end together, I may screw them together first and properly position them and then apply it. Ordinarily, however, it is more convenient to apply the enamel first, so that is the specific method I now prefer. It will also be understood that by the term enamel I mean to include all substances of the general character of enamel which may be found suitable for coating pipes, my invention being not so much concerned with the specific nature of the material used as with the method of its use.

By my invention I am enabled to produce joints which are absolutely tight and over which there is a smooth, even coating of enamel. At the same time the joints are easy to make and there is little likelihood that they will be imperfect.

In accordance with the provisions of the patent statutes, I have described the principle of operation of my invention, together with the particular method which I now consider to represent the best manner for carrying it out, but I desire to have it understood that the particular method disclosed is only illustrative and that the invention may be carried out with such modifications as come within the scope of the appended claims.

What I claim as new and desire to secure by Letters Patent of the United States, is:—

1. The method of enameling a joint between two conduit members one of which enters the other, which comprises providing one member with a shoulder adjacent which the end of the other member is adapted to lie, fastening the members together with the end of the one member spaced from the shoulder, filling enamel into said space, and then fusing the enamel.

2. The method of forming an enameled joint between two members which comprises providing one of said members with a threaded portion and a shoulder and the other with a threaded portion, applying liquid enamel to the members, screwing them together to bring the end of the one member into spaced relation with the shoulder on the other, drying said enamel, and then fusing it.

3. The method of forming an enameled joint between two members which comprises providing one of said members with a threaded portion and a shoulder and the other with a threaded portion, applying enamel to the members, screwing them together to bring the end of the one member into engagement with the shoulder and then backing it off to bring the end and shoulder into spaced relation, and fusing the enamel.

4. The method of enameling a joint be-between a fitting and a pipe end which comprises providing the fitting at the ends of its threads with a shoulder of substantially the thickness of the pipe end, screwing the pipe end and fitting together until the end of the pipe is spaced slightly from the shoulder, filling such space full of enamel, and then fusing the enamel.

5. The method of enameling a joint between a fitting and a pipe end which comprises providing the fitting at the ends of its threads with a shoulder of substantially the thickness of the pipe end, placing liquid enamel on the shoulder, the pipe end or both, screwing the pipe end and fitting together to bring the pipe end into spaced relation to the shoulder, and drying and fusing the liquid enamel.

6. The method of forming an enameled joint between a fitting and a pipe end, which comprises providing the fitting with a shoulder, enameling the fitting including the shoulder, enameling the pipe including its end surface, fastening the pipe end and fitting together with the pipe end spaced from the shoulder and with liquid enamel in said space, and drying and fusing said liquid enamel.

In witness whereof, I have hereunto set my hand this 5th day of October, 1921.

THOMAS A. WRY.